United States Patent [19]

Herchenbach et al.

[11] 4,311,459
[45] Jan. 19, 1982

[54] INSTALLATION FOR CALCINING FINELY DIVIDED PARTICLES

[75] Inventors: Horst Herchenbach, Troisdorf; Hubert Ramesohl, Bergisch-Gladbach, both of Fed. Rep. of Germany

[73] Assignee: Klockner-Humboldt-Deutz AG, Fed. Rep. of Germany

[21] Appl. No.: 165,291

[22] Filed: Jul. 2, 1980

[30] Foreign Application Priority Data

Aug. 1, 1979 [DE] Fed. Rep. of Germany ....... 2931197

[51] Int. Cl.³ .......................... F27D 1/00; F27B 7/02
[52] U.S. Cl. ..................................... 432/247; 432/106
[58] Field of Search ................. 432/106, 247, 266; 98/DIG. 10; 241/23

[56] References Cited

U.S. PATENT DOCUMENTS

| | | | |
|---|---|---|---|
| 1,732,239 | 10/1929 | Luce | 432/266 |
| 2,443,620 | 6/1948 | Hubbard | 432/106 |
| 3,103,315 | 9/1963 | Gerlach | 241/23 |
| 3,442,496 | 5/1969 | Dionisotti et al. | 432/106 |
| 3,765,612 | 10/1973 | Wenger | 241/23 |
| 4,078,882 | 3/1978 | Houd | 432/106 |

FOREIGN PATENT DOCUMENTS 2818224 11/1979 Fed. Rep. of Germany .... 98/DIG. 10

Primary Examiner—John J. Camby
Attorney, Agent, or Firm—Hill, Van Santen, Steadman, Chiara & Simpson

[57] ABSTRACT

An installation for calcining finely divided particles such as for the preparation of cement including a building which houses a pre-heater, a relatively short rotary tubular kiln which receives the pre-heated particles from the pre-heater, and a rotary cooler which receives the discharge from the rotary kiln, the rotary cooler having a discharge end received in a portion of the building below the pre-heater, the discharge end of the rotary cooler being surrounded by sound absorbing material.

7 Claims, 2 Drawing Figures

INSTALLATION FOR CALCINING FINELY DIVIDED PARTICLES

BACKGROUND OF THE INVENTION

1. Field of the Invention

This invention is in the field of assemblies for calcining particles such as those used in the production of cement and provides an integrated pre-heater, rotary kiln, rotary cooler installation which uses less space than conventional assemblies and which is arranged to meet environmental standards without large capital investments.

2. Description of the Prior Art

In erecting an industrial facility such as, for example, a cement plant certain requirements regarding low emission levels and noise tolerances are fixed by law. The tendency of such laws is in the direction of increased tightening for the foreseeable future, so that it is extremely important that the design of a production facility take these matters into account at the earliest possible stage. The demands for more stringent environmental protection and the devices required to meet such standards in industrial systems frequently may result in achievement only with a financial outlay substantial enough so that the plant is no longer competitive.

SUMMARY OF THE INVENTION

The present invention provides a facility which is characterized by the low emission levels required for environmental protection, particularly of harmful materials and noise. This is achieved with a minimum level of investment and increased operating costs, and results in optimum production since it represents a functionally balanced overall concept.

In accordance with the present invention, the rotary tubular kiln is relatively short and the cooler operates as a retrograde cooling aggregate, so that the particulate material passes in one direction through the rotary tubular kiln and in the opposite direction through the cooler. For purposes of noise abatement, the discharge end of the cooler projects into the building which houses the heat exchanger and is surrounded by sound absorbing material. The noise emission which is highest at the discharge end of the cooler is significantly damped and can be kept within required limits by relatively simple means.

In a preferred form of the invention, the cooler employed is a rotary tubular cooler. The external dimensions of such a cooler can approximately coincide with those of the rotary tubular kiln so that the overall system design can be functionally harmonized. The discharge end of the cooler terminates at a significant distance from the outer wall of the heat exchanger building in a direction opposite from the rotary tubular kiln.

These features provide the advantage that there is a noise insulating structure which is relatively uncomplicated and therefore can be employed with a relatively low outlay for costs and components inasmuch as the heat exchanger building is already in existence and is well suited for the integration of noise insulating walls in the structural design of this system.

Another feature of the invention is that the inlet end of the rotary kiln and the discharge end of the rotary cooler can be received in receptacles which are interconnected. The noise emission is further reduced by means of this feature and also at a slight capital expense.

The sound insulation at the end of the rotary kiln eliminates one of the most disruptive sources of particulate emission since it is connected to the enclosure for the cooler discharge.

It is well known that a danger of dust formation exists at the rotary tubular kiln due to "puffing" the hot oven gases. Moreover, a ring formation can occasionally occur in the area of the sintering preparation zone of the rotary tubular kiln with material being dammed in front of the ring and the material forcing the resilient adjacent slip ring seals open, thereby allowing hot gas as well as dust to escape. With the arrangement of the present invention, particularly the receptacles enclosing the ends of the rotary tubular kiln and the cooler, and being connected to one another, the dust emission in normal operation is prevented. Furthermore, the unpleasant consequences of ring formation are simultaneously overcome since dust and/or heated material emerging in the intake area of the cooler line are below the rotary kiln and are picked up by the cooler.

The relatively short rotary kiln can also be provided with a tertiary air line. The matching of dimensions between the short rotary tubular kiln and the rotary tubular cooler employed in the present invention permits the use of an extremely short rotary kiln with a calcinator connected at the material side. In particular, the amount of difference in length between the rotary tubular kiln and the cooler is less than the length dimension of the heat exchanger building. This makes it possible to arrange a retrograde cooling aggregate under the rotary tubular kiln in such a manner that the end of the cooler at the discharge side projects into the heat exchanger building when the end of the rotary tubular kiln at the intake side likewise projects into the heat exchanger building.

A further embodiment of the present invention provides that the ratio of length to diameter in the rotary tubular kiln and in the rotary tubular cooler are approximately equal. It is advantageous that the ratio of length to diameter lies approximately between 12:1 and 6:1 for both, and preferably between 10:1 and 9:1. This dimensioning makes it possible to use an extremely compact structure which involves favorable capital costs. Furthermore, due to the small radiating surfaces present, the heat loss of the rotary tubular kiln is reduced. In addition, the noise absorbing portion of the system can be rendered significantly simpler and cheaper as a result of this compact structure.

A further feature of the invention resides in providing a crushing aggregate device connected to the cooler and located in the heat exchanger building. With this arrangement, the noise and dust emission proceeding from the crushing aggregate can be kept within the required limits without additional expenditure, because the dust is drawn up by the cooler and the noise is retained in the noise insulated building.

BRIEF DESCRIPTION OF THE DRAWINGS

The invention is described in greater detail in the attached sheets of drawings in which.

DESCRIPTION OF THE PREFERRED EMBODIMENTS

Figure 1:
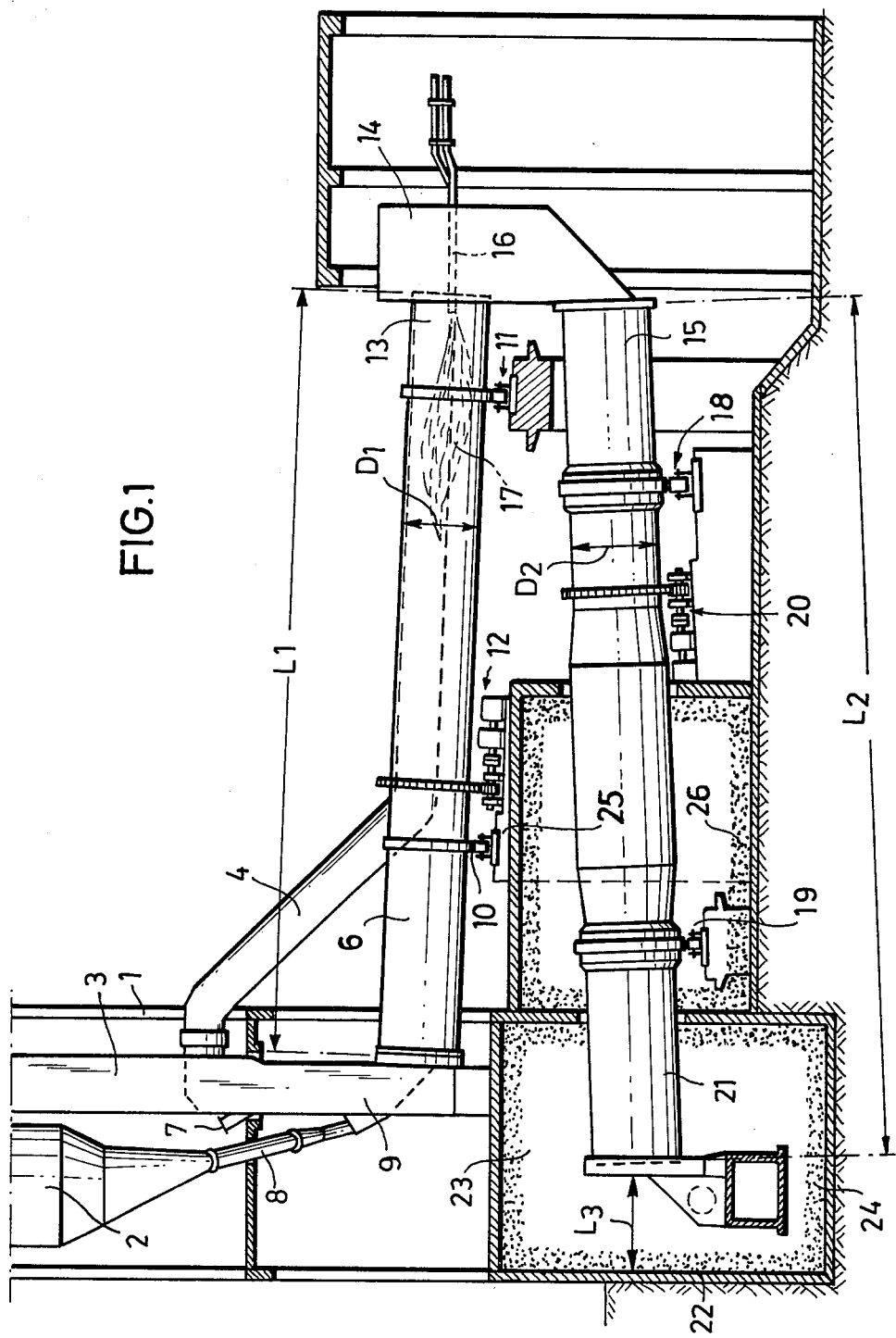
FIG. 1 illustrates a rotary tubular kiln and retrograde cooling aggregate partially in cross section and partially in elevation.

In FIG. 1, there is illustrated the lower end of a heat exchanger building 1. Contained in this building is a heat exchanger composed of superimposed cyclones, the lowest of which, identified at reference numeral 2, is shown in the drawing connected to the gas side of a calcinator 3. The calcinator 3 is supplied with hot air through a tertiary air line 4 and with hot exhaust gases from a rotary tubular kiln 6. An inlet 7 is provided for the introduction of fuel. Heated, calcined raw meal is fed through a line 8 from the cyclone 2 into an inlet end 9 of the rotary tubular kiln 6. The kiln 6 is a relatively short tubular kiln, for example, with a length $L_1$ of approximately 40 meters, and a diameter $D_1$ of approximately 4 meters. The rotary tubular kiln 6 is preferably mounted for rotation in two roller stations 10 and 11 and is driven in a drive station 12 by means of a gear drive employing a motor-gear-pinion arrangement as is well known in the prior art. A discharge end 13 of the rotary tubular kiln 6 is connected to a housing 14 into which the intake end of a rotary tubular cooler 15 is connected below the rotary tubular kiln 6. The rotary tubular cooler 15, for example, has an overall length $L_2$ of approximately 44 meters with a diameter $D_2$ of about 4.8 meters. A burner lance 16 provides a flame 17 in the rotary tubular kiln and passes through the common housing 14 connecting the rotary tubular kiln 6 to the rotary tubular cooler 15. The rotary tubular cooler 15 is seated on two roller stations 18 and 19 and is rotated by means of a drive means 20. In its central area, the rotary tubular cooler 15 is slightly enlarged in diameter in order to decelerate the material passage. In this area, the insulation of the rotary tubular cooler 15 terminates with a fireproof lining so that the area 21 of the rotary tubular cooler at the discharge side requires no lining, since the temperature of the material to be cooled has already been significantly reduced. However, the noise emission proceeding from the cooler 15 is also increased.

The discharge end 21 of the cooler projects substantially into the heat exchanger building 1 and terminates at a distance $L_3$ from the exterior wall 22. An extremely sturdy, compact arrangement of rotary tubular kiln 6 and the cooler 15 lying thereunder is obtained by means of this type of arrangement.

In order to reduce the noise emission, particularly that which proceeds from the area 21 of the cooler 15 at its discharge side, the lowest story 23 of the heat exchanger building 1 is isolated with a sound absorbing material 24. This noise absorbing material 24 is also extended beyond the area of the foundation 25 for the drive station 12 through the use of a sound absorbing lining 26.

Figure 2:
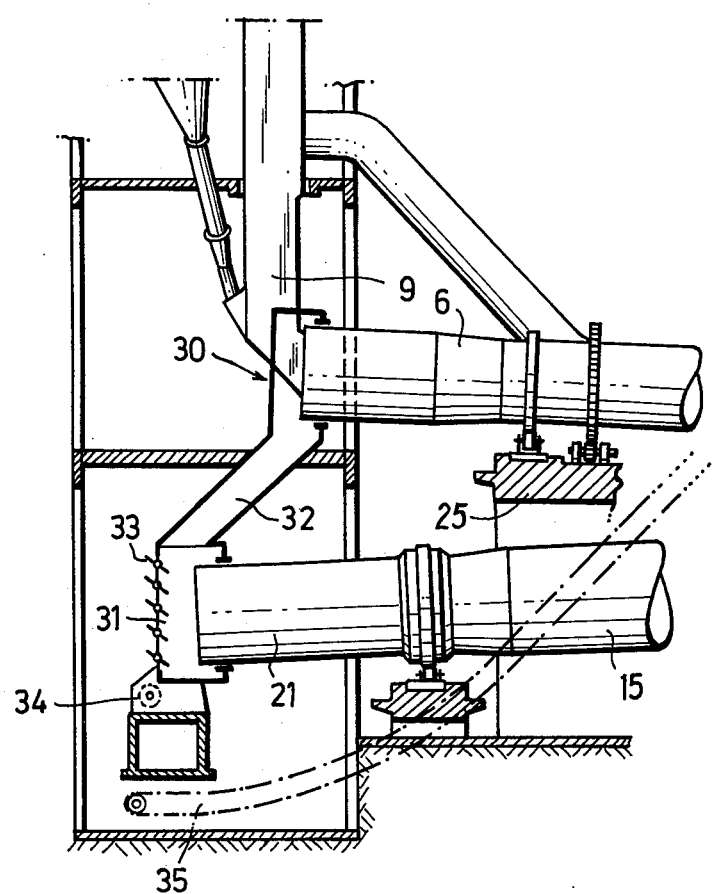
FIG. 2 shows the embodiment of the invention in which ends of the rotary tubular kiln and the rotary tubular cooler at the heat exchanger side are disposed in suitable interconnected receptacles.

In FIG. 2, there is shown a section from the arrangement shown in FIG. 1 whereby the intake area 9 of the rotary tubular kiln 6 is surrounded with a dust receptacle 30. The end 21 of the rotary tubular cooler 15 on its discharge side is likewise surrounded with a dust receptacle 31. These two receptacles 30 and 31 are connected by means of a chute 32. This has the purpose of diverting dust or material arising in the receptacle 30 toward the bottom into the dust receptacle 31 and sucking it into the rotary tubular cooler 15 as a result of the cooling air entering with reduced pressure. In order to control the amount of cooling air entering, the dust enclosure 31 may be provided with adjustable louver baffles 33. A hammermill 34 discharges into a transport means 35 below it, as illustrated schematically in the drawing, and is arranged below the cooler discharge area 21 for the comminution of discharged material. By means of the arrangement of receptacles 30 and 31 as well as their connection to the chute 32, the working zones in the area of the rotary tubular kiln intake 9 as well as the discharge area 21 of the rotary tubular cooler including the hammermill 34 are kept free from dust. This is important for preserving health as well as for the safety and protection of the operating personnel against accidents at these locations. With the system of the present invention, particularly with the retrograde cooler projecting into the heat exchanger wall, the main noise emission sources are kept under control with modest amounts of noise absorbing material 24 and 26 being required. By means of the spatially compact structure, the system is particularly economical with respect to both capital costs as well as with respect to the energy and operating costs, and requires only a fraction of the space requirements of older systems.

It should be evident that various modifications can be made to the described embodiments without departing from the scope of the present invention.

We claim as our invention:

1. An installation for calcining finely divided particles comprising:
   a building having exterior and interior walls,
   a pre-heater located in said building,
   a relatively short rotary tubular kiln receiving the pre-heated particles from said pre-heater,
   a rotary tubular cooler having an inlet and receiving the discharge of said kiln and having a discharge end received in a portion of said building below said pre-heater, said rotary cooler being positioned below said rotary kiln such that particles pass through said kiln in one direction and through said cooler in the opposite direction, and
   sound absorbing material surrounding the discharge end of said cooler.

2. An installation according to claim 1 which includes:
   a first enclosure receiving the inlet end of said rotary kiln,
   a second enclosure receiving the discharge end of said rotary cooler, and
   means for interconnecting said first and second enclosures.

3. An installation according to claim 1 which includes:
   a calcinator connected to the gas side of said pre-heater, and
   an air line connecting said calcinator to said rotary kiln.

4. An installation according to claim 1 in which the ratios of length to diameter of the rotary tubular kiln and the rotary tubular cooler are substantially the same.

5. An installation according to claim 4 in which the ratios of length to diameter range from approximately 12:1 to 6:1.

6. An installation according to claim 5 in which the ratios of length to diameter are in the range from 10:1 to 9:1.

7. An installation according to claim 1 which includes a crushing means receiving the discharge from said cooler and being located in the heat exchanger building.

* * * * *